United States Patent [19]

Lee

[11] 4,196,431

[45] Apr. 1, 1980

[54] SYNCHRONOUS RASTER SCAN APPARATUS FOR DISPLAY DEVICE

[75] Inventor: Ernest P. Lee, Acton, Mass.

[73] Assignee: Honeywell Information Systems Inc., Waltham, Mass.

[21] Appl. No.: 773,040

[22] Filed: Feb. 28, 1977

[51] Int. Cl.2 .............................................. G06F 3/14

[52] U.S. Cl. .................................. 340/749; 340/814; 358/150

[58] Field of Search ........... 340/324 AD, 324 A, 749, 340/814; 358/148, 150

[56] References Cited

U.S. PATENT DOCUMENTS

| | | | |
|---|---|---|---|
| 3,598,911 | 8/1971 | Helbig | 340/324 AD |
| 3,916,402 | 10/1975 | Hornung | 340/324 AD |

*Primary Examiner*—Marshall M. Curtis

*Attorney, Agent, or Firm*—William A. Linnell; Ronald T. Reiling; Nicholas Prasinos

[57] ABSTRACT

A display device includes improved raster scan apparatus which provides for the video display of information in timed synchronization with cycles of AC power. The raster scan apparatus includes a circuit which monitors the periodicity of the AC input power to the display device. This circuit is operative to initialize certain raster scan logic which thereafter authorizes the next raster scan sweep. In this manner, each raster scan is synchronized with respect to the cyclical AC power. This synchronization eliminates visible distortion on the video output of the display device.

6 Claims, 10 Drawing Figures

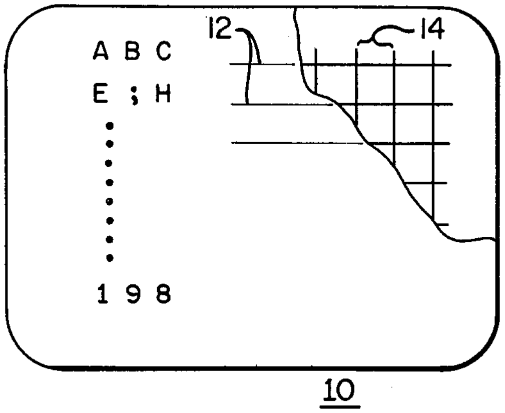
FIG. 1
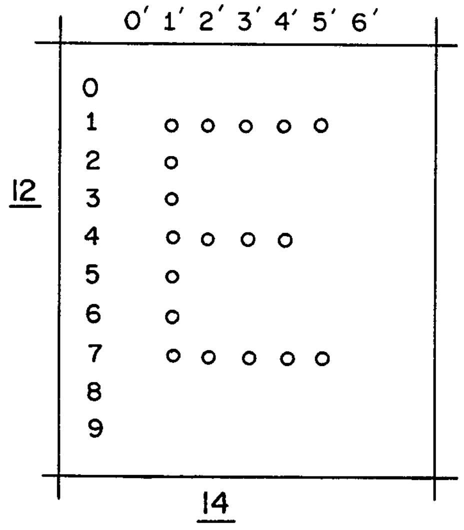
FIG. 2
FIG. 3
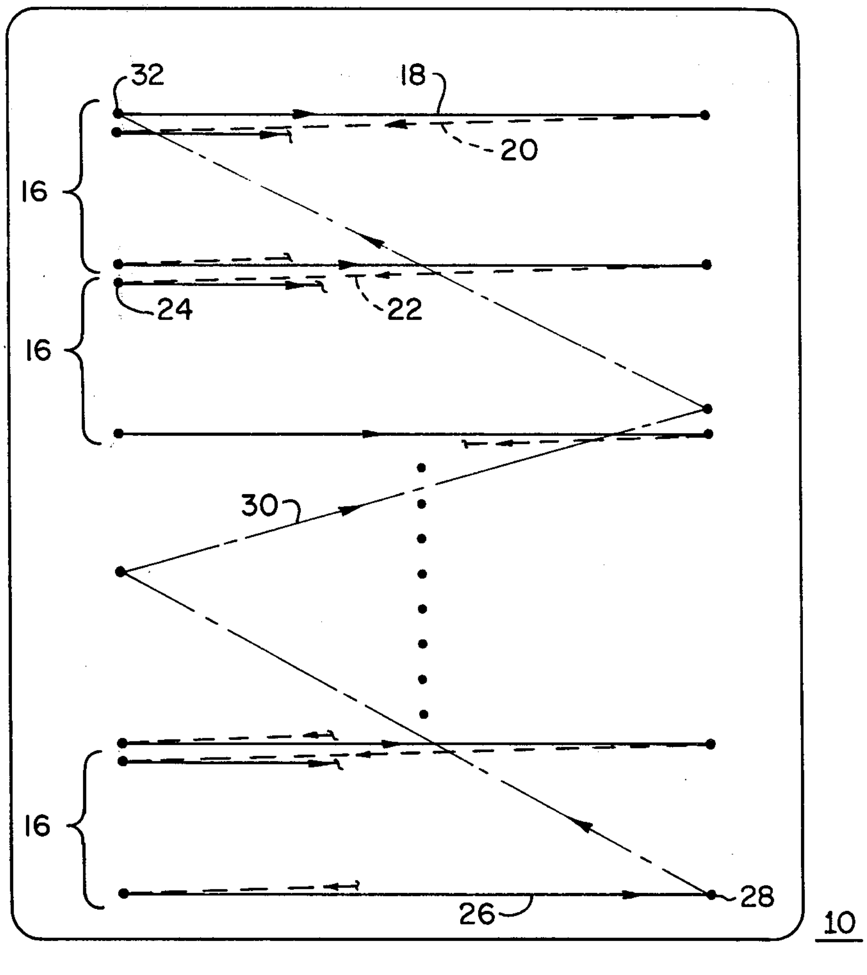

SYNCHRONOUS RASTER SCAN APPARATUS FOR DISPLAY DEVICE

BACKGROUND OF THE INVENTION

1. Field of the Invention

This invention relates to the display of information on a cathode ray tube. In particular, this invention pertains to the manner in which information is continually displayed and/or refreshed on a CRT.

2. Description of the Prior Art

Information is normally displayed on the cathode ray tube of a display device by selectively energizing an electron beam as it scans the sensitized screen. The beam normally scans the screen from left to right in a succession of horizontal scan paths which begin at the top of the screen and end at the bottom of the screen. The beam is subsequently returned to the top of the screen for the next successive raster scan of the entire screen. This is accomplished by beam drive circuitry associated with the cathode ray tube which magnetically deflects the beam in both the horizontal and vertical directions.

Magnetic fields other than those of the beam drive circuitry also cause deflection of the electron beam. Stray magnetic fields are commonly produced by the power supply which provides the power for the entire display device. It has been observed that these particular stray fields produce visible distortion on the screen when the frequency of the AC input power to the power supply varies with respect to the raster scan frequency. In this regard, the information on the screen appears to "swim" thereby giving rise to a dynamic distortion to the viewer.

OBJECTS OF THE INVENTION

It is an object of this invention to provide a new and improved display device.

It is another object of this invention to provide a display device which is substantially free of distortion due to fluctuations in the AC power.

It is still further object of this invention to provide a display device wherein the display of information is synchronized with respect to the AC power cycle.

SUMMARY OF THE INVENTION

The above objects are achieved according to the present invention by providing a display device with a relatively high-speed raster scan that is synchronized with respect to each cycle of AC power. In the preferred embodiment, the display device is a computer terminal which displays alphanumeric characters in a number of distinct rows. Logic internal to the display device timely defines when these rows are to either be initially displayed or subsequently refreshed on a cathode ray tube. This logic includes means for synchronizing each complete display of information with respect to a cycle of AC power. The synchronizing means includes a circuit which detects when a particular point in each cycle of AC power occurs. The circuit signals certain high-speed raster scan logic when this detection occurs. The high-speed raster scan logic is in turn initialized for implementation of the next successive raster scan sweep. The raster scan sweep is completed prior to the detection of another point in the next power cycle or, with severe power line frequency fluctuations, may be terminated by the detection of the next A.C. cycle so that the next scan sweep can begin and the raster scan rate will be maintained at one frame per A.C. cycle.

BRIEF DESCRIPTION OF THE DRAWINGS

For a better understanding of the present invention, reference should be made to the accompanying drawings wherein:

FIG. 1 is a video display of information on the screen of a computer terminal;

FIG. 2 illustrates the formation of a character within the video display of FIG. 1;

FIG. 3 illustrates the raster scan necessary to accomplish the video display of FIG. 1;

DESCRIPTION OF THE PREFERRED EMBODIMENT

Figure 4:
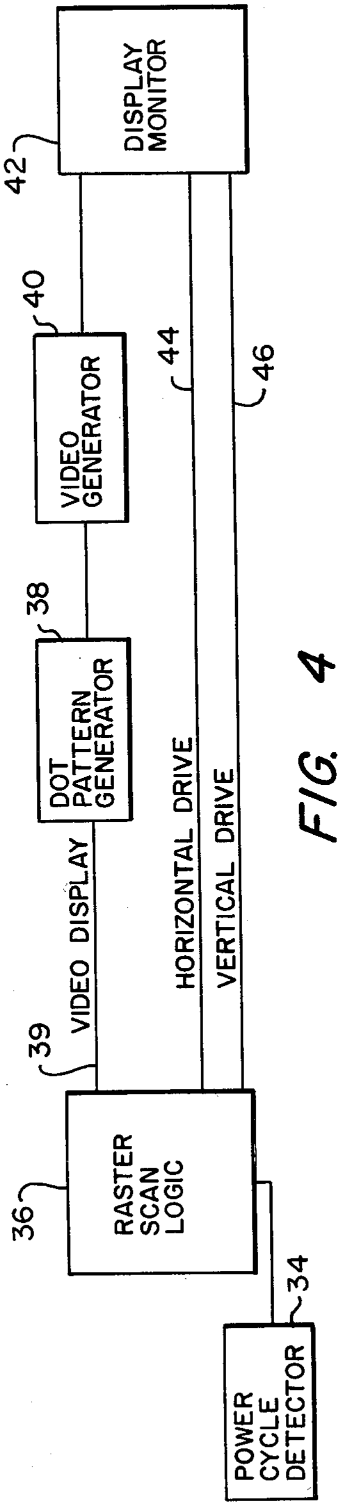
FIG. 4 is a block diagram of the display logic necessary to form the video display of FIG. 1.

Referring to FIG. 1, a display screen 10 is illustrated along with a particular arrangement of alphanumeric characters appearing thereon. Such a display is commonly found in computer terminals wherein information is displayed for any number of purposes. It is to be noted that the alphanumeric characters appearing in FIG. 1 are arranged in a plurality of rows 12 and columns 14. In the preferred embodiment, a maximum of 80 characters are sequentially formed in a given row. There are moreoever twenty-four such rows appearing on the screen 10 of FIG. 1.

Referring now to FIG. 2, the alphanumeric character occupying the second row and first column location on the screen 10 of FIG. 1 has been illustrated in detail. The particular alphanumeric character which is illustrated is that of the letter "E". This character is formed along with the other characters in the second row by sequentially illuminating appropriate dots on a number of horizontal scan lines. These horizontal scan lines are numbered 0 through 9 in FIG. 2. Dots are illuminated within these lines at dot locations denoted as 0′ through 6′. In particular, dot locations 1′ through 5′ are selectively illuminated so as to define a given line of each character that is to be formed within a given row.

Referring now to FIG. 3, a typical raster scan is illustrated for the entire screen 10. It is to be understood that such a raster scan would be necessary in order to form the displayed arrangement of characters in FIG. 1. In this regard, the raster scan comprises a number of individual rows such as 16. Each individual row comprises 10 individual horizontal scan paths such as 18. Each individual scan path is accompanied with a retrace path such as 20 which brings the electron beam back to a position for the next horizontal scan from left to right. The next successive row of characters begins once a retrace path has been completed for the tenth scan path of the previous row of characters. In this regard, a retrace path 22 brings the electron beam back to a point 24 for the subsequent scan path of the next successive row. This process continues to occur until twenty-four separate rows have been formed on the screen 10. At this time, the electron beam will have traversed a final horizontal scan path 26 in the bottommost row. This final horizontal scan is subsequently repeated until such time as the next cycle of AC input power is detected. The next time the electron beam reaches a point 28 at the end of the scan path 26, it is caused to retrace a dotted outline path 30 back to a point 32 wherein the next succession of horizontal scans begin. The dotted outline path 30 will hereinafter be referred to as the vertical retrace.

It is to be appreciated that successive raster scans must occur at a sufficient rate to refresh the displayed information on the screen 10 of FIG. 1. The rate of successive raster scans is dependent on successive completions of power cycles in accordance with the invention. It is anticipated that the variance of the standard AC power supply might be as great as 2 to 3 cycles per second. This variance in the power will still produce a significant number of raster scans so as to appropriately refresh any information displayed on the screen 10.

Referring now to FIG. 4, a power cycle detector 34 is operatively coupled to a raster scan logic 36. The power cycle detector 34 synchronizes the operations of the raster scan logic 36 with respect to the occurrence of a power cycle. The exact manner in which this is accomplished will become apparent hereinafter.

The raster scan logic 36 controls the display of information through a video display signal that is applied to a dot pattern generator 38 via a line 39. The dot pattern generator 38 feeds a video generator 40 which in turn selectively energizes an electron beam within a display monitor 42. This results in the successive illumination of various dots on the screen 10 such as has been illustrated in FIG. 2.

The aforementioned illumination of dots occurs while the electron beam is being driven in a horizontal direction across the screen 10. This is accomplished within the display monitor 10 by the beam drive circuitry. This circuitry is responsive to a horizontal drive signal from the raster scan logic 36. The horizontal drive signal appears on a line 44 and is operative to both initiate horizontal scans as well as subsequent horizontal retraces by the electron beam. It is to be noted that the raster scan logic is operative to disable the dot pattern generator 38 during such retraces. This is accomplished by generating an appropriate video display signal on the line 39 which disables the dot pattern generator 38 during such retraces.

The raster scan logic is also operative to initiate a vertical retrace of the electron beam within the display monitor 42. It will be remembered that the vertical retrace is not initiated until such time as the power cycle detector 34 has detected the next power cycle. At this time, the power cycle detector signals the raster scan logic 36 which in turn generates a vertical drive signal on a line 46. This causes the beam drive circuitry within the display monitor 42 to move the electron beam back to the top of the screen. The raster scan logic also disables the dot pattern generator 38 during this vertical retrace. At the end of vertical retrace, the raster scan logic again generates appropriate video display and horizontal drive signals to initiate the next succession of horizontal scans by the display monitor.

It is to be understood that certain of the heretofore-mentioned elements within FIG. 4 are well known in the art and will therefore not be disclosed in detail herein. In particular, dot pattern generator 38 and video generator 40 are well known elements which are to be found in the character generator portion of almost any display terminal. These elements are commercially available from Intel Corporation of Santa Clara, California 95051. It is furthermore to be noted that the display monitor 42 is also a common element to be found in almost any display terminal. Display monitors may be obtained commercially from Ball Brothers Inc. of St. Paul, Minnesota 55113.

Figure 5:
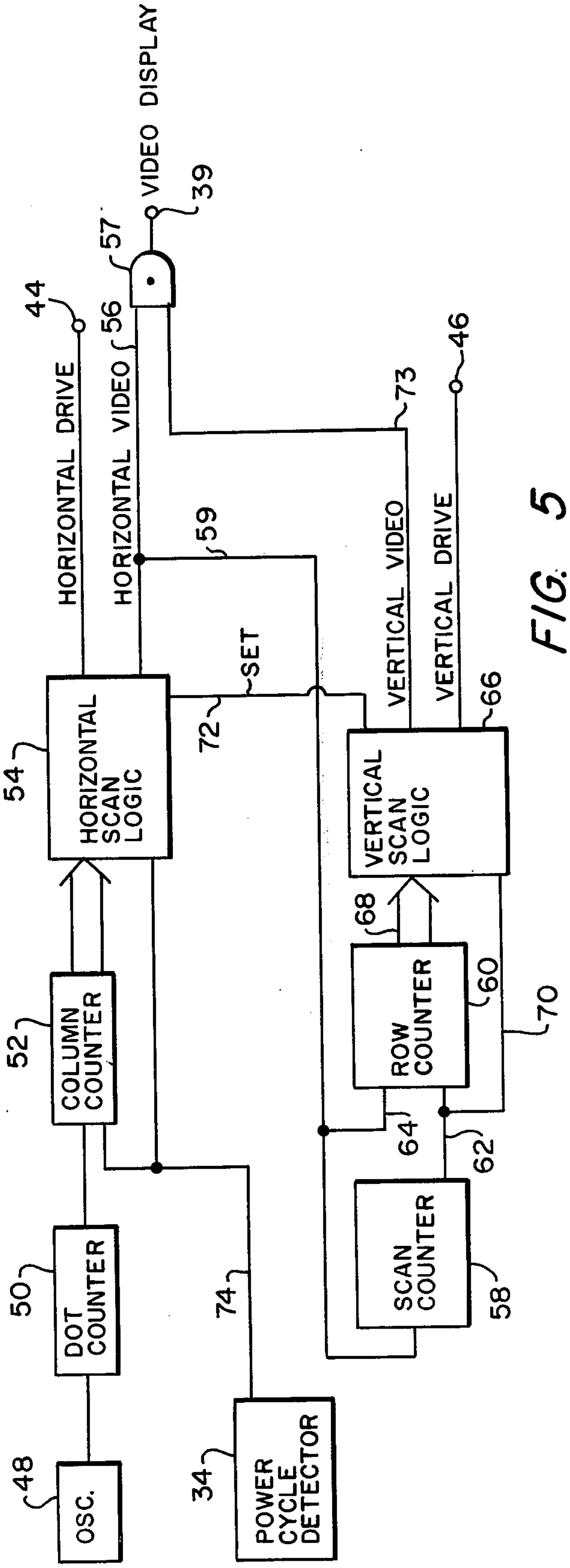
FIG. 5 is a block diagram of the raster scan logic which performs the raster scan of FIG. 3.

FIG. 5 illustrates the raster scan logic of FIG. 4 in further detail. The raster scan logic begins with a continuous oscillator 48 which drives a dot counter 50. The dot counter 50 defines the seven dot locations that occur for each character in a given horizontal scan. This has been previously discussed with regard to FIG. 2. The output of the dot counter 50 is used to clock a column counter 52 which generates a cyclical column count of 0 through 111.

The aforementioned cyclical column count is applied to a horizontal scan logic 54. The horizontal scan logic 54 is operative to generate a horizontal drive signal on the line 44 and a horizontal video signal on a line 56. The horizontal drive signal is applied to the beam deflection circuitry within the display monitor 42 of FIG. 4. The horizontal video signal is applied to an AND gate 57. The output of the AND gate 57 constitutes the video display signal which is applied to the dot pattern generator 38 of FIG. 4. In the preferred embodiment, the horizontal scan logic causes the beam deflection circuitry to implement a horizontal retrace during the column counts of 0 through 31. This is accomplished by generating an appropriate horizontal drive signal on the line 44. The horizontal scan logic also causes the beam deflection circuitry to implement a horizontal scan during the column counts of 32 through 111. This is accomplished by generating another appropriate horizontal drive signal on the line 44. The horizontal scan logic furthermore disables the dot pattern generator during the column counts of 0 through 31 and subsequently enables the same during the column counts of 32 through 111. This is accomplished by generating an appropriate horizontal video signal on the line 56 which in turn influences the video display signal occurring at the output of the AND gate 57.

The video output of the horizontal scan logic 54 is also applied to a scan counter 58 via a line 59. The scan counter 58 incrementally counts the horizontal scans of the electron beam. It will be remembered from the discussion of FIGS. 1 through 3 that ten horizontal scans occur for each row of characters. The scan counter 58 hence performs a cyclical scan count of 0 through 9 so as to thereby define the ten horizontal scans necessary to complete a given row of characters.

The scan counter 58 is operative to signal a row counter 60 when the tenth scan is occurring. This signalling occurs over a line 62 which connects the output of the scan counter 58 to the input of the row counter 60. The row counter 60 also receives the horizontal video signal from the horizontal scan logic 54. It will be remembered that the horizontal scan logic 54 defines the length of tin e in which a horizontal scan is to take place. In this regard, the horizontal video signal from the horizontal scan logic 54 appearing on the line 64 indicates when a given horizotal scan has been completed. The row counter 60 is hence provided with an indication as to when a tenth scan is occurring via the line 62 as well as when the same has been completed via the line 64. The latter increments the row counter to a new row count. In this regard, the row counter 60 is successively incremented from a row count of zero through to a row count of 23. This defines the twenty-four rows which are preferably displayed on the screen 10 of FIG. 1. It is important to note that the row counter 60 produces an additional two row counts after the row count of 23 has been reached. In other words, the row counter 60 is operative to provide a maximum row count of 25. The necessity for the two additional row counts over and above the row count of 23 will become apparent hereinafter.

The row count appearing at the output of the row counter 60 is applied to a vertical scan logic 66 via a conduit 68. The vertical scan logic 66 also receives the output from the scan counter 58 via a line 70. The vertical scan logic 66 is operative to suspend any further operations of the horizontal scan logic 54 at such time as a row count of 23 is received along with an output signal from the scan counter 58 indicating that a tenth scan is occurring. This set of signal conditions will occur at such time as the electron beam is completing the tenth scan of the twenty-four row. The vertical scan logic signals the horizontal scan logic 54 by a set signal occurring on a line 72.

The horizontal scan logic suspends operations until such time as the power cycle detector 34 detects the beginning of the next power cycle. At this time, the power cycle detector 34 signals the horizontal scan logic to again initiate operations. The signal from the power cycle detector 34 occurs on a line 74 and is applied to the column counter 52 as well as the horizontal scan logic. The horizontal scan logic 54 subsequently increments both the scan counter 58 as well as the row counter 60. This causes the row count appearing at the output of the row counter 60 to reach a row count of 24. The vertical scan logic 66 is responsive to this row count of 24 so as to generate a vertical drive signal on the line 46 and a vertical video signal on a line 73. The vertical drive signal initiates the vertical retrace within the display monitor 42. The vertical video signal is applied to the AND gate 57. The video display signal which is subsequently produced at the output of the AND gate 57 blanks the dot pattern generator during the vertical retrace. The vertical retrace is completed by a row count of 25 so as to thereby allow the electron beam to begin an uppermost horizontal scan on the screen 10. This horizontal scan will be identified as a scan count of 0 and a row count of 0. The electron beam is now again driven through twenty-four rows of ten scans each under the control of the horizontal scan logic 54.

Having now described the overall operation of the raster scan logic, it is now appropriate to turn to a detailed disclosure of the power cycle detector 34. The power cycle detector 34 is illustrated in detail in FIG. 6. A transformer 76 provides an appropriate step-down of the AC input power prior to rectification by a diode bridge 78. The output of the diode bridge 78 is connected in a conventional manner to a power supply 80. The power supply 80 provides appropriate voltage levels throughout the communications terminal.

A band-pass filter 82 is connected to a terminal of the diode bridge 78 so as to receive a half-wave rectification of the stepped-down AC input from the transformer 76. This allows the band-pass filter to receive the positive half-cycle of the AC input voltage. This positive half-cycle is filtered by the band-pass filter 82 so as to eliminate any noise. The signal occurring at the output of the band-pass filter 82 is a positive half-cycle signal A. The half-cycle signal A is applied to the negative input of a comparator 84. The comparator 84 is preferably an LM311 which may be obtained from the National Semiconductor Corporation, Santa Clara, California. The output of the comparator 84 is fed back to the positive input of the comparator 84 via a feedback path 86. The output of the comparator 84 is logically high until such time as a non-zero signal level is detected at the output of the band-pass filter 82. At this time, the output of the differential amplifier 84 switches logically low and is moreover latched in such logically low signal condition by the positive feedback path 86. This logically low signal condition continues until such time as the filtered half-cycle of the band-pass filter 82 returns to a zero state. At this time, the output of the comparator 84 switches logically high.

The output signal of the comparator 84 is denoted as a power signal B occuring on an output line 88. As has been previously discussed, this power signal B will be logically low during the positive half-cycle of the AC input voltage signal and logically high during the negative half-cycle of the AC input voltage signal. The negative half-cycle of AC input voltage will hereinafter be referred to as the first half of a power cycle whereas the positive half-cycle will be referred to as the last half of a power cycle.

The power signal B is inverted through an inverter 90 and applied to a trailing edge detection circuit 92. The trailing edge detection circuit 92 is operative to generate a narrow negative pulse upon the occurrence of a negative going signal change in the inverted power signal B appearing at the output of the inverter 90. This is denoted by a pulse signal C occurring at the output of the trailing edge detection circuit 92. It is to be appreciated that the pulse signal C represents the initial detection of the negative half-cycle of AC input voltage as the same is detected by the comparator 84. As will become apparent hereinafter, the pulse signal C will be utilized by the raster scan logic for the purpose of initiating raster scans. It is to be noted that the pulse signal C occurs on an output line 74.

Figure 7:
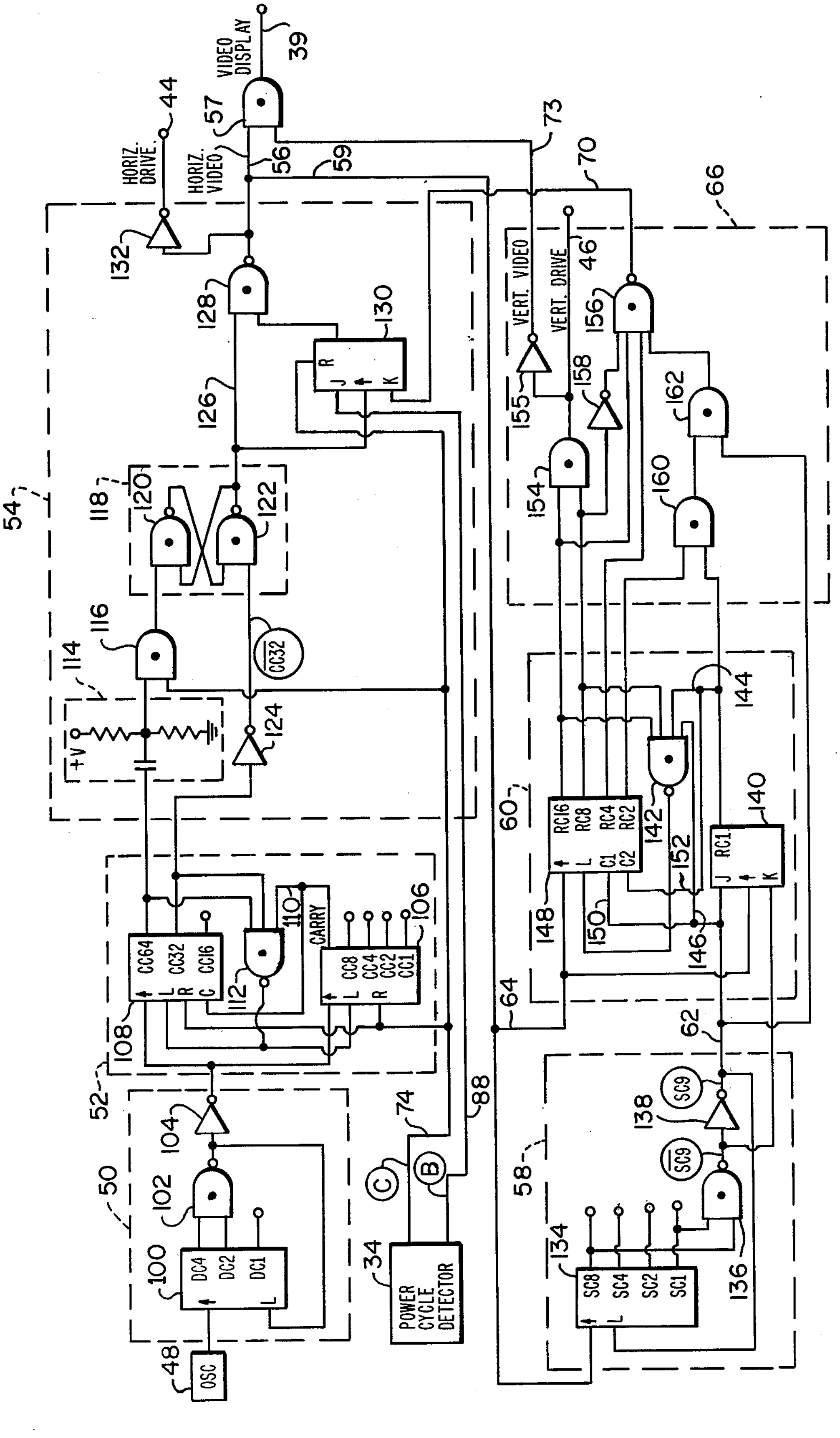
FIG. 7 is a further detailed illustration of the raster scan logic of FIG. 5.

Referring now to FIG. 7, the power cycle detector 34 is illustrated in conjunction with the detailed circuitry of the raster scan logic of FIG. 5. In this regard, it is to be noted that the functional elements of FIG. 5 have been similarly labelled in FIG. 7. Turning now to the detailed logic of FIG. 7, it is seen that the dot counter 50, the column counter 52, the scan counter 58 and the row counter 60 each include one or more four-bit counters. These counters are preferably 74LS161 counters obtainable from Texas Instruments, Dallas, Texas. Each counter has a number of commonly denoted inputs. In this regard, the clock inputs are denoted by vertical arrows. A positive signal transition at one of these clocking inputs will cause the counter to incrementally change count. Each counter also contains a load input terminal indicated by the letter "L". A logically low signal condition at the load input will cause the respective counter to load a predefined count at such time as a positive signal transition occurs at the clock input. Some of the counters in FIG. 7 also include a carry enable terminal denoted by the letter "C". A logically high signal at the carry enable input enables the counter to incrementally count upon the occurrence of the next positive signal transition at the clocking input. Finally, certain of the counters in FIG. 7 also have reset inputs denoted by the letter "R". A logically low signal at the reset input terminal R will cause the count of the counter to be reset to 0. Further details of the 74LS161 counters can be found in "The Integrated Circuit Catalog For Design Engineers", First Edition, by Texas Instruments, Dallas, Texas.

As has been previously discussed, the raster scan logic includes an oscillator 48 which drives a dot counter 50. The dot counter 50 comprises a binary counter 100 which is preferably a 74LS161 counter. The output terminals of the counter 100 are denoted as DC1, DC2 and DC4. These outputs will go logically high in order to indicate their respective binary dot counts. The dot count outputs of DC2 and DC4 are applied to a NAND gate 102 which generates a logically low signal to the load input L of the counter 100 upon the occurrence of a dot count of 6. The logically low signal at the load input L causes the counter 100 to load in a dot count of zero upon the next positive signal transition at the clocking input. The counter 100 hence defines a cyclical dot count of 0 through 6. These dot counts are utilized to define the dot locations for a character as has been previously described with regard to FIG. 2.

It is to be noted that the output of the NAND gate 102 is also inverted through an inverter 104. The output of the inverter 104 is also the output of the dot counter 50. This output will produce a positive signal transition each time a dot count of 6 occurs.

The output of the dot counter 50 is connected to the clocking inputs of a pair of counters 106 and 108 within the column counter 52. The counters 106 and 108 are preferably 74LS161 counters which respond to the positive signal transitions from the dot counter 50 when dot counts of 6 occur. In this manner, the counters 106 and 108 incrementally count the column or character spaces each time a dot count of 6 occurs.

The output terminals of the column counter 106 are denoted as CC1, CC2, CC4 and CC8 whereas the output terminals of the counter 108 are denoted as CC16, CC32 and CC64. The counters 106 and 108 are joined together by a carry link 110 so as to provide the necessary count capability. In this regard, the counter 106 provides a logically high carry signal to the carry enable input C of the counter 108 each time a maximum column count of 15 occurs. The counter 108 is enabled at this time so as to incrementally change counts upon the occurrence of the next positive signal transition from the dot counter 50.

The maximum count of the column counters 106 and 108 is limited to a column count of 111. This is accomplished by a NAND gate 112 which receives the binary column count signals from the column count output terminals CC32 and CC64 plus the carry enable signal from the counter 106. These signals collectively define a column count of 111 when the same are all logically high. The NAND gate 112 goes logically low under these signal conditions. The logically low signal from the NAND gate 112 is applied to the load inputs L of the counters 106 and 108 so as to thereby allow the same to load a predefined binary count upon the occurrence of the next positive signal transition to their respective clocking inputs. In the preferred embodiment, this predefined count is 0. In this manner, the counters 106 and 108 combine to define a cyclical column count of 0 through 111 at the output of the column counter 52.

It is to be noted that the counters 106 and 108 each receive the pulse signal C from the power cycle detector 34. This pulse signal is applied to the reset inputs "R" of the counters 106 and 108 in such a manner as to timely reset the counters to a column count of zero. This will be more fully discussed hereinafter.

Turning now to the horizontal scan logic 54, this logic receives certain column count signals from the column counter 52. In this regard, the column count signal from the output terminal CC64 is applied to a trailing edge detector 114. The trailing edge detector 114 is operative to generate a narrow-width negative pulse at such time as the signal indicative of the column count of 64 goes logically low. This will occur at such time as a zero count is loaded into the counter 108 following a column count of 111. The narrow-width negative pulse occurring at the output of the trailing edge detector 114 is applied to an AND gate 116 which also receives the pulse signal C from the power cycle detector 34 via the line 74. As has been previously discussed, a narrow-width negative pulse occurs in the pulse signal C when the power cycle detector detects the next power cycle. It is therefore to be appreciated that both signals which are applied to the AND gate 116 are normally logically high except for the momentary occurrences of narrow-width negative pulses. The output of the AND gate 116 is therefore normally logically high except for the momentary occurrences of the narrow-width negative pulses.

The output of the AND gate 116 is connected to a latch circuit 118 comprising a pair of cross-coupled NAND gates 120 and 122. The bottom NAND gate 122 of the latch circuit 118 receives the negation of the 32nd column count through an inverter 124 which inverts the 32nd binary colum count signal from the output terminal CC32. The output of the bottom NAND gate 122 constitutes the output of the latch circuit 118.

The output of the latch circuit 118 is applied to a NAND gate 128 via a line 126. The NAND gate 128 also receives the output of a flip-flop 130. The output of the flip-flop 130 is normally logically high so as to thereby enable the NAND gate 128 to respond to the output of the latch circuit 118. In this regard, the so-enabled NAND gate 128 acts as an inverter with respect to the output of the latch circuit 118. It is merely to be noted at this time that the flip-flop 130 is also operative to disable the NAND gate 128 from responding to the output of the latch circuit 118. This will be more fully described hereinafter.

The output of the NAND gate 128 constitutes the video output of the horizontal scan logic 54. This output produces the horizontal video signal on the line 56 which is applied to the AND gate 57. The output of the NAND gate 128 is applied to an inverter 132 which defines the drive output of the horizontal logic 54. The drive output produces the horizontal drive signal occurring on the line 44.

Figure 8A:
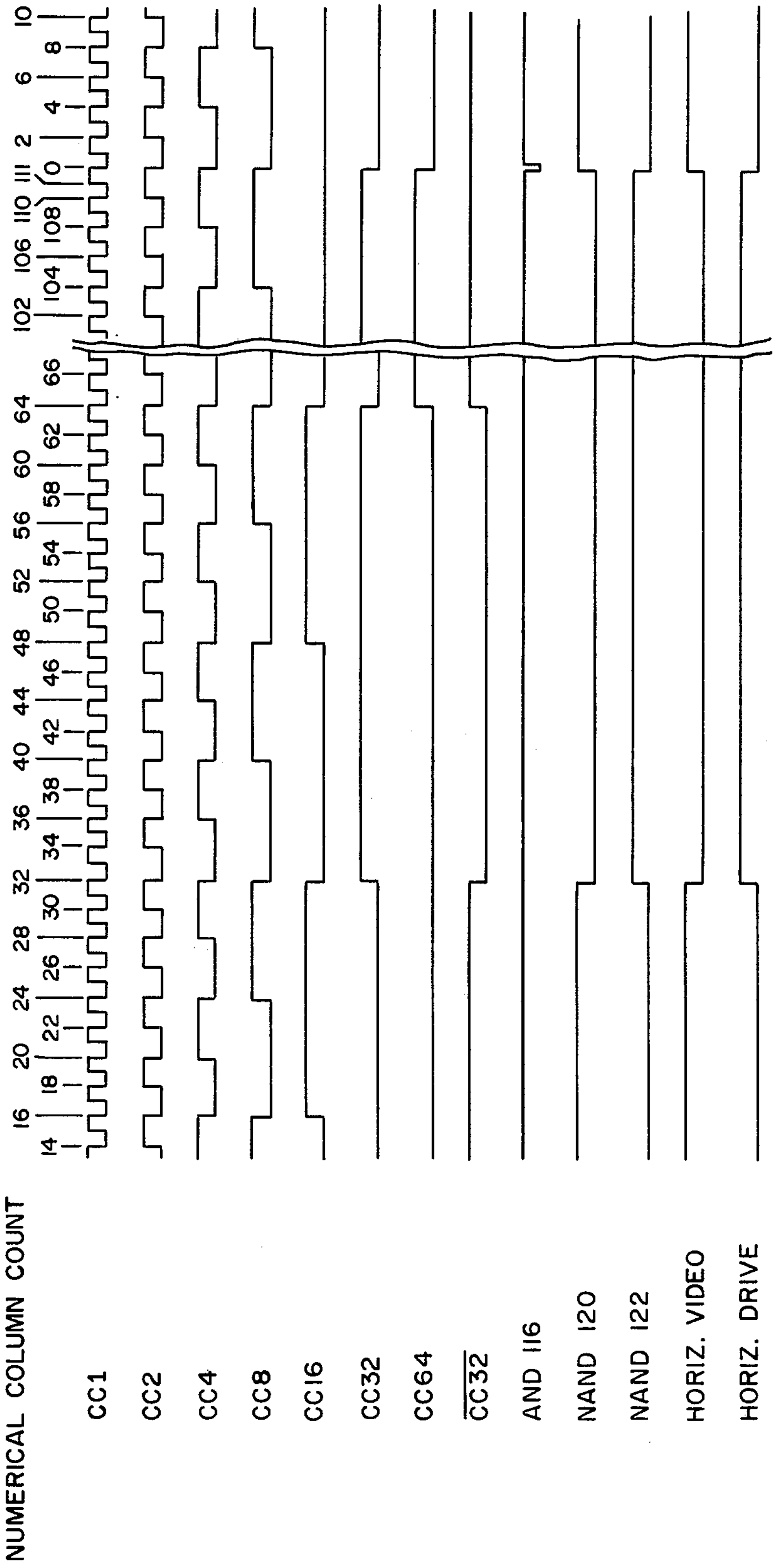
FIGS. 8A, 8B and 8C illustrate signal waveforms present in the detailed raster scan logic of FIG. 7.

The operation of the horizontal scan logic in response to the column counts from the column counter 52 is illustrated in FIG. 8A. In this regard, the numerical column count appears above the binary column count signals CC1 through CC64. Other signals shown in FIG. 8A include the negation of the 32nd binary column count signal, the output signals of the AND gate 116 and the NAND gates 120 and 122 as well as the horizontal video and horizontal drive signals.

It is first of all seen that the NAND gate 122 will go logically high when the negation of the 32nd colum signal denoted as signal $\overline{CC32}$ goes logically low. This will occur at a column count of 32. The logically high output of the NAND gate 122 at the column count of 32 sets the NAND gate 120 logically low. The logically low output of the NAND gate 120 disables the NAND gate 122 from responding to the next change in the signal $\overline{CC32}$ at the column count of 96. The output of the NAND gate 122 hence continues to be logically high until the column counter 52 incrementally counts through a column count of 111 back to a column count of zero. At this time, the trailing edge detector 114 responds to the binary column count signal CC64 going low so as to thereby generate a narrow-width negative pulse. This pulse is gated through the AND gate 116 and is applied to the NAND gate 120 so as to set the latter momentarily high. The $\overline{CC32}$ signal has also gone high at this time since the column count of 32 is now zero making the negation of this count equal to one. The $\overline{CC32}$ signal combines with the momentarily high signal state of the NAND gate 120 so as to set the NAND gate 122 low. The low signal state of the NAND gate 122 is applied to the NAND gate 120 thereby causing the NAND gate 120 to remain high. This high signal state of the NAND gate 120 enables the NAND gate 122 to respond to the next high-to-low signal transition by the signal $\overline{CC32}$. This latter event again occurs at the next column count of 32.

As has been previously noted, the output of the NAND gate 122 is normally inverted by the NAND gate 128. The signal at the output of the NAND gate 128 constitutes the video output of the horizontal scan logic and is otherwise referred to as the horizontal video signal. This signal is seen to be logically high for column counts of 0 through 31 and logically low for column counts of 32 through 111.

As has also been previously noted, the output of the inverter 132 constitutes the drive output of the horizontal scan logic 54. The signal occurring at this output is referred to as the horizontal drive signal. This signal is seen to be logically low for column counts of 0 through 31 and logically high for column counts of 32 through 111.

Returning now to FIG. 7, the horizontal video signal is applied to the scan counter 58 via the line 59. The signal transition of the horizontal video signal at a column count of 0 is operative to increment a four-bit binary counter 134. The four-bit binary counter is preferably a 74LS161 counter which has been previously described. The binary outputs SC1, SC2, SC4 and SC8 of the counter 134 define the binary scan counts of 1, 2, 4 and 8. The binary scan counts of 1 and 8 are applied to a NAND gate 136 which defines the negation of the scan count of 9. This is subsequently inverted through an inverter 138 so as to define the scan count of 9. The scan count of 9 is fed back to the load input L of the counter 134 so as to cause the same to define a cyclical scan count of 0 through 9. This particular scan count defines the ten scan paths necessary to display a row of characters as has been previously described with regard to FIGS. 2 and 3.

Figure 8B:
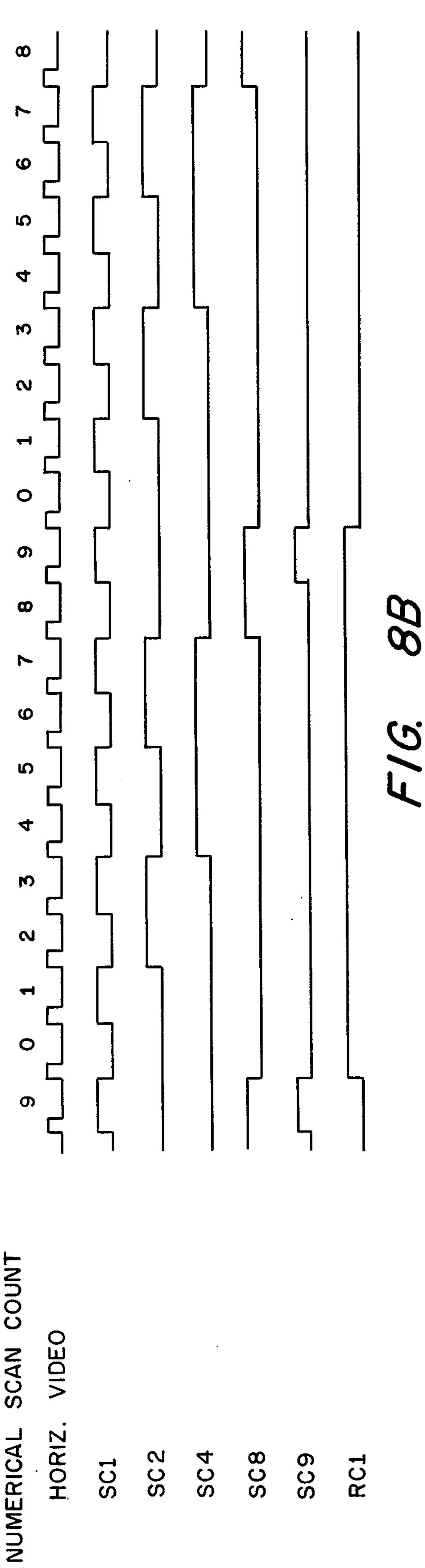

The operation of the scan counter is particularly illustrated in FIG. 8B. In this regard, the horizontal video signal is first illustrated in conjunction with the numerical scan counts. The binary scan count signals of SC1, SC2, SC4, SC8 and SC9 appear thereunder. It is seen that the binary scan counts are incremented successively in response to the positive signal transitions in the horizontal video signal.

Returning now to FIG. 7, the output of the scan counter 58 is applied to the J-input of a flip-flop 140 within the row counter 60. As has been previously noted, the output of the scan counter 58 produces a signal indicative of the scan count of 9. The K-input of the flip-flop 140 receives the signal indicative of the negation of the scan count of 9. The clocking input of the flip-flop 140 receives the horizontal video signal via the line 64. The output of the flip-flop 140 follows the signal applied to its J-input upon receipt of a positive signal transition at its clocking input. The flip-flop 140 is preferably a 74LS109 which is commercially available from Texas Instruments, Dallas, Texas.

The output of the flip-flop 140 is denoted as RC1. This output produces a signal indicative of a binary row count of 1. Referring to FIG. 8B, this signal is logically high in response to the next pulse occurring in the horizontal video signal following the previous occurrence of a scan count of 9. It is to be appreciated that the binary row count of 1 will thus not occur until a tenth line scan has been completed in the previous row.

Returning now to FIG. 7, the row count output RC1 of the flip-flop 140 is applied to a NAND gate 142 via a line 144. The NAND gate 142 also receives the scan count of 9 signal SC9 via a line 146. The NAND gate 142 furthermore receives the binary row count signals RC8 and RC16 from a counter 148. These signals collectively define a row count of 25 and a scan count of 9 when the same are all logically high. The NAND gate 142 goes logically low under these signal conditions. This logically low signal is applied to the load input of the counter 148. In this regard, the counter 148 will load a zero count at such time as the next positive signal transition occurs at its clocking input via the line 64. It follows that a count of zero will be loaded into the counter 148 at such time as a positive signal transition occurs in the horizontal video signal following a scan count of 9 and a row count of 25.

Figure 8C:
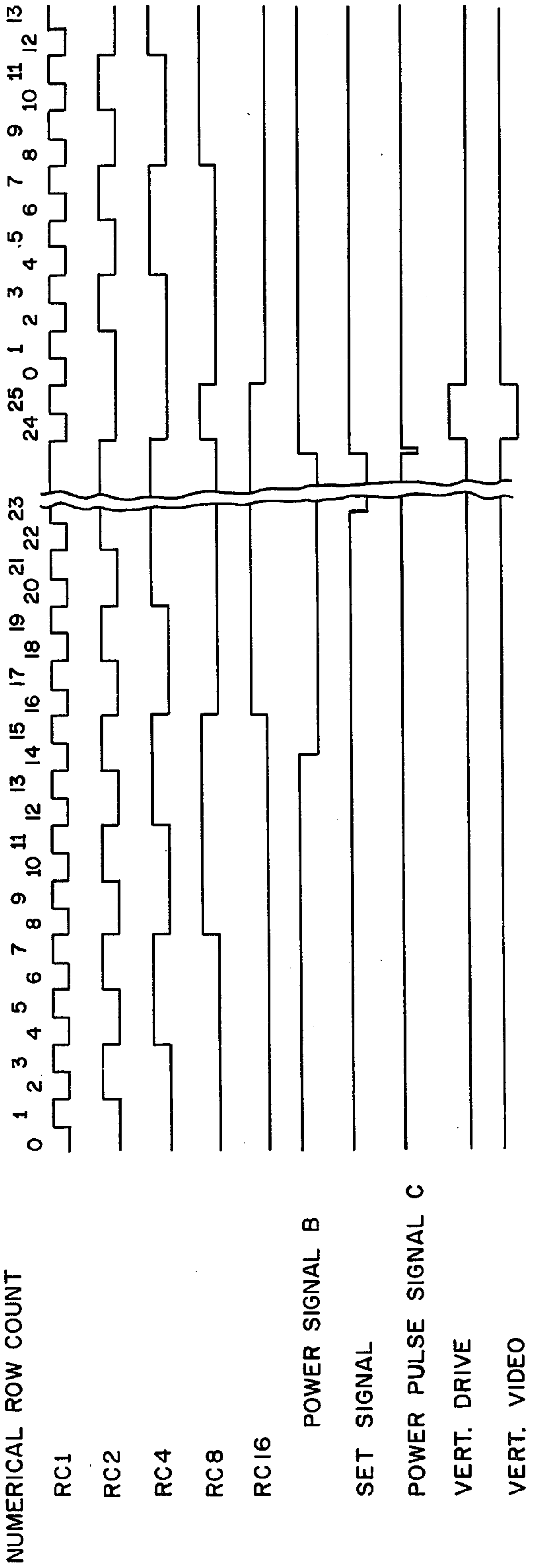

The counter 148 is operative to incrementally count in response to two separate carry enable conditions. The first of these is the occurrence of a scan count of 9, which is marked by a logically high binary scan count signal SC9. This signal is applied to a carry enable input C1 via a line 150. The second carry enable condition is the occurrence of a row count of 1 which is marked by a logically high row count signal at the output RC1. This signal is applied to a carry enable input C2 via a line 152. The counter 148 is operative to incrementally count upon the next occurrence of a positive transition in the horizontal video signal on the line 64. The binary row count outputs of RC2, RC4, RC8 and RC16 are thus appropriately activated by the counter 148. In this manner, the counter 148 in combination with the flip-flop 140 define the cyclical row count of 0 through 25. The various binary row count signals are illustrated in FIG. 8C together with the numerical row counts.

Turning now to the vertical scan logic 66 which receives the binary row count signals RC1 through RC16 as well as the scan count of 9 signal SC9. It is to be remembered that the vertical scan logic 66 is operative to generate a vertical drive signal so as to thereby cause the electron beam to retrace a substantially vertical path from the bottom to the top of the screen 10. The vertical drive signal is internally produced within the vertical scan logic by an AND gate 154 which receives the binary row count signals RC8 and RC16. The AND gate 154 will produce a logically high vertical drive signal for a row count of 24. This logically high signal will cause the display monitor 42 to implement a vertical retrace as has been previously discussed. This logically high signal will continue to occur until the counter 148 within the row counter 60 is set to zero following a scan count of 9 and a row count of 25. This will allow ample time for the vertical retrace to have occurred within the display monitor 42. It is to be noted that the vertical scan logic also produces a vertical video signal. This is accomplished by merely inverting the vertical drive signal by an inverter 155. The vertical video signal is applied to the AND gate 57 via the line 73 so as to produce a logically low video signal to the dot pattern generator. This logically low signal disables the dot pattern generator during vertical retrace.

The vertical scan logic 66 is also operative to produce a set signal on the line 70 which governs the flip-flop 130. This signal is produced by a NAND gate 156 which receives the binary row count signals RC4 and RC16 together with the inversion of the binary row count signal RC8 as produced by an inverter 158. A pair of AND gates 160 and 162 combine to produce a fourth input signal to the NAND gate 156 which is logically high when the binary row count signals RC1 and RC2 are high together with a logically high scan count of 9 signal SC9. It is to be appreciated that the NAND gate 156 will switch low at such time as a row count of 23 is reached together with a scan count of 9. This logically low signal constitutes the set signal which is applied to the K-input of the flip-flop 130 via the line 70.

Figure 6:
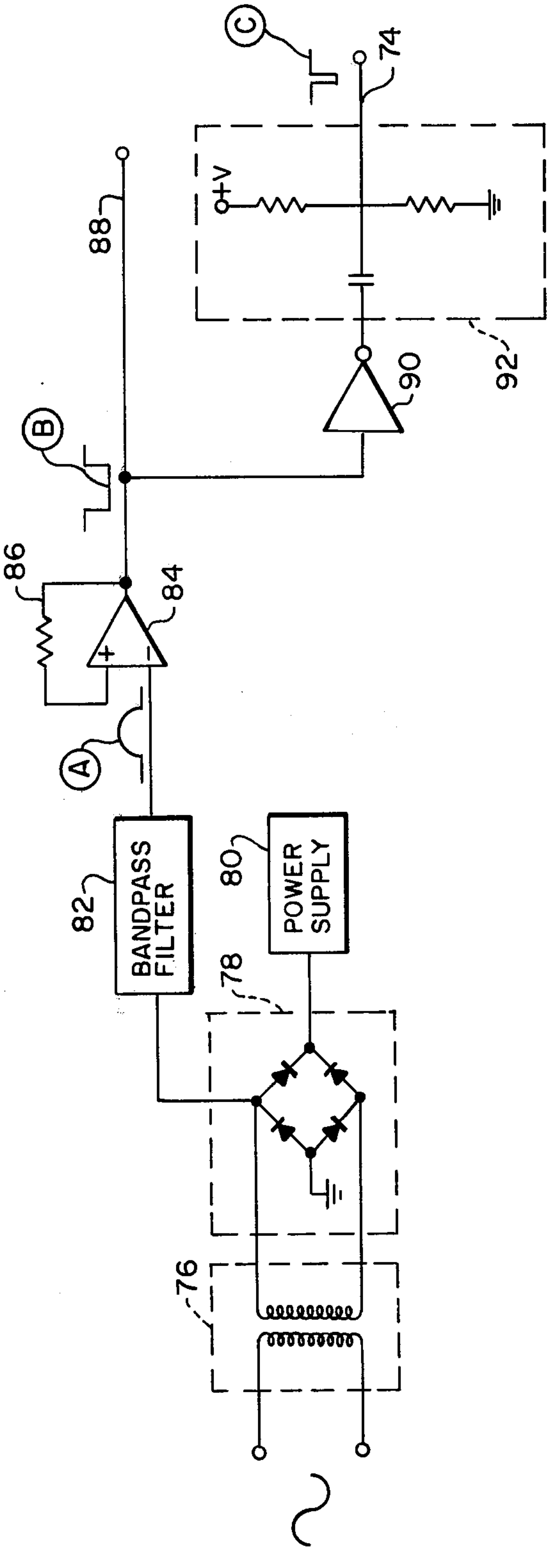
FIG. 6 is a detailed illustration of the power cycle detector appearing in FIGS. 4 and 5.

It will be remembered from the discussion of the power cycle detector 34 in FIG. 6 that the power signal B is logically low for the last half of the AC power cycle. This logically low signal condition in the power signal B combines with the logically low condition of the set signal from the vertical scan logic so as to define two simultaneously low signals at the J and K inputs of the flip-flop 130. These logically low signals at the J and K inputs of the flip-flop 130 cause the output of the flip-flop 130 to go logically low upon the occurrence of the next positive signal transition from the latch circuit 118. The next positive signal transition from the latch circuit 118 occurs when the tenth horizontal scan of the twenty-fourth row (identified by the row count of 23 and scan count of 9) is completed. The flip-flop 130 thereby goes low so as to disable the NAND gate 128. The disabled NAND gate 128 ceases to produce any positive signal transitions in the horizontal video signal. This in turn disables any further clocking of the scan counter 58 and the row counter 60. This will cause the row counter 60 to maintain a row count of 23 and a scan count of 9.

The power signal B subsequently goes logically high during the first half of the next power cycle. The power cycle detector 34 is operative to produce a narrow-width negative pulse in the power pulse signal C at this time. The occurrence of the narrow-width negative synchronization pulse resets the flip-flop 130 logically high which in turn enables the NAND gate 128. The narrow-width pulse in the power pulse signal C is also applied via the line 74 to the reset inputs of the counters 106 and 108 within the column counter 52. This causes these counters to begin counting from a column count of zero. This immediately initiates a new horizontal scan signal and advances the row counter 60 to a count of 24, whereby the sequence of operations for beginning a new raster scan is triggered even if the power signal C occurs before the previous raster scan is completed. The narrow-width pulse in the power pulse signal C is still further applied via the line 74 to the AND gate 116. This produces a momentary low input signal to the NAND gate 120 which in turn sets the NAND gate 122 low. The NAND gate 122 is now ready to respond to the next occurrence of a column count of 32. In this manner, appropriate signal transitions again occur at the output of the latch circuit 118 for column counts of 0 and 32. These transitions are inverted through the NAND gate 128 so as to produce the positive signal transitions in the horizontal video signal at column counts of 0. The positive signal transitions at the zero column counts increment the scan counter 58 and the row counter 60 so as to produce the row counts of 24 and 25 at the output of the row counter 60. The row count of 24 initiates the vertical drive signal which continues through to a row count of 25. As has been previously explained, the row counter 60 is automatically returned to a zero count upon the occurrence of a row count of 25 followed by a scan count of 9. The horizontal scan logic 54 subsequently causes the first horizontal scan to occur for the row count of zero.

The above operations of the raster scan logic are to be furthermore understood by referring to FIG. 8C which illustrates the various signals occurring at the outputs of the row counter 60, the vertical scan logic 66 and the power cycle detector 34. In this regard, the binary row count signals RC1, RC2, RC4, RC8 and RC16 are first illustrated together with the numerical row count. It is seen that the binary row count signals are operative to sequentially define numerical row counts of 0 through 23. During this time, the power signal B from the power cycle detector 34 is first logically high during the first half of the current power cycle. The power pulse signal B subsequently goes logically low during the second half of the current power cycle. It is seen that the set signal from the vertical scan logic 66 goes logically low shortly after the numerical row count of 23. The set signal on the line 70 actually goes low at a row count of 23 and a scan count of 9. It will be remembered that the logically low signal state of the set signal combines with the logically low signal state of the power signal B so as to define logically low signal conditions at both the J and K inputs of the flip-flop 130 within the horizontal scan logic 54. It will furthermore be remembered that the flip-flop 130 is caused to follow a logically low signal state at such time as a positive signal transition is received from the latch circuit 118. This occurs shortly after the transition of the set signal in FIG. 8C. At this time, the binary row count signals are frozen at their respective signal states which define the numerical row count of 23. This continues to occur until the next power cycle is detected by the power cycle detector 34. It will be remembered that this occurs at such time as the power signal B goes logically high thus indicating the occurrence of the initial negative portion of the next power cycle. The power cycle detector 34 produces a negative pulse in the power pulse signal C at this time which resets the flip-flop 130 logically high. This in turn enables the NAND gate 128 within the horizontal scan logic 54. The horozintal scan logic subsequently provides appropriate clocking to the scan counter 58 and the row counter 60 so as to thereby arrive at a row count of 24. At this time, the vertical drive signal at the output of the vertical scan logic 66 goes logically high as indicated in FIG. 8C. The vertical video signal goes logically low at this time so as to thereby blank the dot pattern generator. The vertical drive and vertical video signals remain in their respective signal states during the vertical retrace which is accomplished during the row counts of 24 and 25. The vertical drive subsequently returns to a logically low signal state whereas the vertical video returns to a logical high signal state at such time as the numerical row count changes to a zero row count. The horizontal scan logic 54 subsequently causes the first horizontal scan to occur during the row count of zero.

From the foregoing, it is to be appreciated that a preferred embodiment has been disclosed of a raster scan system which is synchronized with respect to the power cycles of a power supply. It is to be noted that the logic elements used to thereby implement such a system may have equivalents which could be used as substitutes within the preferred embodiment without departing from the scope of the present invention.

What is claimed is:

1. Apparatus for controlling a video raster generator in an information display system employing a cathode ray tube (CRT) and an AC power source comprising, in combination:
- first scanning means for generating a series of horizontal scan signals controlling the horizontal scanning of the electron beam in said CRT;
- first counting means for counting the number of said horizontal scan signals to produce first and second scan control signals, said first scan control signal indicating the completion of a raster scan;
- inhibit means responsive to said first scan control signal for terminating the operation of said first counting means on completion of said raster scan;
- detection means for detecting the occurrence of a cycle of AC power applied by said power source and for generating a synchronization signal on initiation of each AC power cycle;
- means controlled by said synchronization signal for resetting said first scanning means to begin a new horizontal scan signal and for disabling said inhibit means, whereby said first counting means continues operation to generate said second scan control signal;
- second scanning means responsive to said second scan control signal for producing a vertical retrace signal returning said electron beam vertically to a raster starting position, and
- reset means included in said first counting means for resetting said counting means to an initial reference value after occurrence of said second scan control signal whereby a new raster scan is initiated in sync with said AC power supply.

2. The apparatus of claim 1 wherein said first scanning means comprises:
- an oscillator for generating a train of timing signals; and
- second counting means receiving said timing signals and generating said horizontal scan signals such that each said signal extends for an interval which is terminated in response to the count of a first predetermined number of said timing signals or to the occurrence of said synchronization signal, whichever occurs first.

3. The apparatus of claim 2 wherein said second counting means generates, prior to each said horizontal scan signal, a horizontal retrace signal determined by the count of a second predetermined number of said timing signals.

4. The apparatus of claim 3 wherein said second counting means comprises:
- a first counter connected to said oscillator and driven by said timing signals to repetitively execute a counting cycle defining the width of a character position on said CRT;
- a second counter connected to said first counter and driven thereby to repetitively execute a counting cycle defining the period of one horizontal retrace signal and the adjacent horizontal scan signal; and
- a decoding circuit connected to the output of said second counter for producing an output signal having a first level representing said horizontal scan signal and a second level representing said horizontal retrace signal.

5. The apparatus of claim 1 wherein said detection means comprises:
- means for rectifying a cycle of AC power; and
- means for producing a signal indicating when the output of said rectifying means is at a level other than zero.

6. The apparatus of claim 1 wherein said first counting means comprises:
- a height counter connected to said first scanning means and driven by said horizontal scan signals to repetitively execute a counting cycle defining the height of a character position on said CRT; and
- a row counter connected to said height counter and driven thereby to repetitively execute a two-part counting cycle, the first part of said cycle defining the interval required to complete said raster scan and terminating on generation of the first to occur of said first scan control signal and said synchronization signal, and the second part of said cycle commencing when said inhibit means is disabled and terminating in response to said resetting operation of said reset means.

* * * * *